US012797159B2

(12) United States Patent
Lee et al.

(10) Patent No.: US 12,797,159 B2
(45) Date of Patent: Nov. 17, 2026

(54) APPARATUS AND METHOD FOR GENERATING VIRTUAL MODEL

(71) Applicant: MEDIT CORP., Seoul (KR)

(72) Inventors: Dong Hoon Lee, Goyang-si (KR); Beom Sik Suh, Seoul (KR)

(73) Assignee: MEDIT CORP., Seoul (KR)

( * ) Notice: Subject to any disclaimer, the term of this patent is extended or adjusted under 35 U.S.C. 154(b) by 308 days.

(21) Appl. No.: 17/864,366

(22) Filed: Jul. 13, 2022

(65) Prior Publication Data

US 2022/0346913 A1 Nov. 3, 2022

Related U.S. Application Data

(63) Continuation of application No. PCT/KR2021/000576, filed on Jan. 15, 2021.

(30) Foreign Application Priority Data

Jan. 15, 2020 (KR) ........................ 10-2020-0005505

(51) Int. Cl.
*G06T 7/50* (2017.01)
*A61C 7/00* (2006.01)
(Continued)

(52) U.S. Cl.
CPC ................ *A61C 7/002* (2013.01); *G06T 7/11* (2017.01); *G06T 17/00* (2013.01);
(Continued)

(58) Field of Classification Search
CPC ........... A61C 7/002; G06T 7/11; G06T 17/00; G06T 2200/08; G06T 2207/20081;
(Continued)

(56) References Cited

U.S. PATENT DOCUMENTS

| | | | |
|---|---|---|---|
| 2007/0265727 A1 | 11/2007 | Bae et al. | |
| 2016/0256035 A1* | 9/2016 | Kopelman | A61C 9/0053 |
| 2017/0076443 A1* | 3/2017 | Ye | A61B 5/742 |
| 2017/0273763 A1 | 9/2017 | Fisker et al. | |
| 2018/0360567 A1 | 12/2018 | Xue et al. | |
| 2019/0167113 A1 | 6/2019 | Kopelman | |

FOREIGN PATENT DOCUMENTS

| | | |
|---|---|---|
| JP | 2006-204826 A | 8/2006 |
| JP | 2009-523552 A | 6/2009 |

(Continued)

OTHER PUBLICATIONS

Scheepens, Visualization, Selection, and Analysis of Traffic Flows, IEEE Transactions on Visualization and Computer Graphics, vol. 22, No. 1, Jan. 2016 (Year: 2016).*

(Continued)

*Primary Examiner* — Vu Le
*Assistant Examiner* — Lei Zhao
(74) *Attorney, Agent, or Firm* — Lex IP Meister, PLLC

(57) ABSTRACT

The present disclosure relates to an apparatus and method for generating a virtual model. The apparatus according to the present disclosure comprises: a scanner that acquires a continuous 2D image within a measurement space; and a model generation unit for generating a three-dimensional virtual model by converting the image acquired from the scanner, wherein the model generation unit removes an area from the three-dimensional virtual model according to the reliability of data and generates a final model on the basis of the remaining area.

20 Claims, 14 Drawing Sheets

(51) Int. Cl.

| | |
|---|---|
| ***G06F 3/0484*** | (2022.01) |
| ***G06F 3/04842*** | (2022.01) |
| ***G06F 3/04845*** | (2022.01) |
| ***G06N 20/00*** | (2019.01) |
| ***G06T 5/77*** | (2024.01) |
| ***G06T 7/11*** | (2017.01) |
| ***G06T 17/00*** | (2006.01) |
| ***G06T 17/20*** | (2006.01) |
| ***G06T 19/20*** | (2011.01) |

(52) U.S. Cl.
CPC .................... *G06T 2200/08* (2013.01); *G06T 2207/20081* (2013.01); *G06T 2207/30036* (2013.01)

(58) Field of Classification Search
CPC ............ G06T 2207/30036; G06T 7/50; G06T 2210/41; G06T 2219/2021; G06T 2200/24; G06T 17/20; G06T 19/20; G06T 2207/10008; G06T 5/77; A61B 5/7203; A61B 5/4547; A61B 5/4552; A61B 5/0073; A61B 5/0088; A61B 5/0033; A61B 5/0077; A61B 2576/00; G06F 3/04842; G06F 3/04845; G06F 3/0484; G06N 20/00
See application file for complete search history.

(56) References Cited

FOREIGN PATENT DOCUMENTS

| | | | |
|---|---|---|---|
| JP | 2019-217263 | A | 12/2019 |
| KR | 10-2017-0077432 | A | 7/2017 |
| KR | 10-2017-0120095 | A | 10/2017 |
| KR | 10-2017-0125924 | A | 11/2017 |
| KR | 10-1954845 | B1 | 3/2019 |
| WO | 2019/122373 | A | 6/2019 |

OTHER PUBLICATIONS

Richards, A guide to astrophotography stacking, BBC SkyatNight Magazine, https://www.skyatnightmagazine.com/astrophotography/astrophoto-tips/a-guide-to-astrophotography-stacking, Jan. 16, 2019 (Year: 2019).*

Reddit, How do i deselect a specific area?, https://www.reddit.com/r/photoshop/comments/9onv6s/how_do_i_deselect_a_specific_area/?rdt=62891, 2018 (Year: 2018).*

Non-final Office Action mailed Dec. 22, 2023 from the Korean Patent Office for Korean Application No. 10-2020-0005055.

Extended European Search Report mailed Jan. 5, 2024 from the European Patent Office for European Application No. 21741804.5.

International Search Report mailed Apr. 15, 2021 for International Application No. PCT/KR2021/000576 and its English translation.

* cited by examiner

APPARATUS AND METHOD FOR GENERATING VIRTUAL MODEL

CROSS-REFERENCE TO RELATED APPLICATIONS

This application is a continuation application of International Application No. PCT/KR2021/000576, filed Jan. 15, 2021, which claims the benefit of Korean Patent Application No. 10-2020-0005505, filed Jan. 15, 2020 in the Korean Intellectual Property Office, the disclosures of which are incorporated herein in their entirety by reference.

TECHNICAL FIELD

The present disclosure relates to an apparatus and method for generating a virtual model.

BACKGROUND ART

In general, in a process of acquiring oral data through an intraoral scanner, it is difficult to measure accurate oral data related to a tooth state as unnecessary data due to so-called soft tissues such as tongue, cheek, and user's finger other than tooth is acquired, which greatly affects scanning precision of the scanner.

Accordingly, a technique of deleting unnecessary soft tissues in the measured oral cavity is most important to obtain accurate oral data.

Conventionally, when unnecessary soft tissue data is measured, the patients need to manually delete unnecessary soft tissues, and thus inconvenience exists and it takes a long time to reduce user convenience, and in some cases, necessary data (oral cavity and gum) is also removed together in the process of deleting the soft tissues.

SUMMARY OF INVENTION

Technical Problem

An object of the present disclosure is to provide an apparatus and method for generating a virtual model, which may generate a tooth model simply and quickly by automatically removing a noise area with low density from measurement data.

Another object of the present disclosure is to provide an apparatus and method for generating a virtual model, which may provide a measurement model with high precision by excluding a necessary area from an area to be deleted while automatically selecting an unnecessary area from the virtual model as the area to be deleted.

Still object of the present disclosure is to provide an apparatus and method for generating a virtual model, which may automatically select a designated area from the virtual model according to a user's icon selection, and generate a tooth model simply and quickly based on the designated area.

The objects of the present disclosure are not limited to the above-described objects, and other objects not mentioned will be clearly understood to those skilled in the art from the following descriptions.

Solution to Problem

To achieve the objects, according to one embodiment of the present disclosure, there is provided an apparatus for generating a virtual model including a scanner configured to acquire a continuous two-dimensional image within a measurement space, and a model generation unit configured to generate a three-dimensional virtual model by converting an image acquired from the scanner.

The model generation unit removes one area according to reliability of data from the three-dimensional virtual model and generates a final model based on the remaining areas.

The model generation unit calculates an area where the reliability of the data is less than a preset reference value in the three-dimensional virtual model, and generates the final model by removing the calculated area.

In addition, the apparatus according to one embodiment of the present disclosure further includes a control unit configured to display the generated three-dimensional virtual model on a display screen, and select the calculated area from the three-dimensional virtual model as an area to be deleted to display the calculated area on the display screen.

The area to be deleted is an area where a data density is less than a preset reference value in the three-dimensional virtual model.

The reference value is adjustable.

The reference value is adjusted by an operation of a selection bar or a button provided on an operation portion of the display screen.

The control unit provides a tool for correcting the area to be deleted through the display screen before generating the final model.

The model generation unit excludes a necessary area from the area to be deleted according to an operation of a de-selection tool.

The necessary area includes a tooth area.

The necessary area includes a tooth area and areas around the tooth area.

The apparatus according to one embodiment of the present disclosure further includes a learning unit configured to perform machine learning using a tooth image and a gum image of reference data as input data, and extract a rule for distinguishing tooth and gum as a learned result of the machine learning when an area lock tool is executed.

In addition, the apparatus according to one embodiment of the present disclosure further includes an image analysis unit configured to segment the tooth image based on the rule extracted as the result of performing the machine learning, and extract the tooth area of the three-dimensional virtual model based on the segmented tooth image.

The model generation unit sets a lock for the tooth area of the three-dimensional virtual model, and excludes the area where a lock is set from the area to be deleted.

The model generation unit sets a lock for an area selected by the operation of the tool, and excludes the area where the lock is set from the area to be deleted when the area lock tool is executed.

The model generation unit automatically selects a designated area from the three-dimensional virtual model by a designated area selection tool, and generates the final model based on the selected designated area.

The designated area selection tool includes a first icon corresponding to the entire target area including the tooth and gum of the three-dimensional virtual model, a second icon corresponding to a gum and tooth area, and a third icon corresponding to a tooth area.

When the first icon is selected, the model generation unit selects the entire target area of the three-dimensional virtual model as the designated area, and generates the final model based on measurement data of the entire target area.

When the second icon is selected, the model generation unit selects the tooth area and some gum areas around the tooth area of the three-dimensional virtual model as the designated area, and generates the final model based on measurement data of the tooth area and some gum areas around the tooth area.

The model generation unit removes an area where reliability of the data is less than a reference value from the gum area of the three-dimensional virtual model.

When the third icon is selected, the model generation unit selects the tooth area of the three-dimensional virtual model as the designated area, and generates the final model based on measurement data of the tooth area.

In addition, to achieve the objects, a method of generating a virtual model according to one embodiment of the present disclosure includes acquiring a continuous image within a measurement space by a scanner, generating a three-dimensional virtual model by converting the image acquired from the scanner, and removing one area according to reliability of data from the three-dimensional virtual model, and generating a final model based on the remaining areas.

Advantageous Effects of Invention

According to the present disclosure, it is possible to generate the tooth model simply and quickly by automatically removing the noise area with low density from the measurement data, thereby increasing user convenience.

In addition, according to the present disclosure, it is possible to provide the measurement model with high precision by excluding the necessary area from the area to be deleted while automatically selecting the unnecessary area as the area to be deleted from the virtual model.

In addition, according to the present disclosure, it is possible to increase the user convenience by providing the tooth model for the area designated by the user as well as automatically selecting the designated area from the virtual model according to the user's icon selection and generating the tooth model simply and quickly based on the designated area.

DESCRIPTION OF EMBODIMENTS

Figure 1:
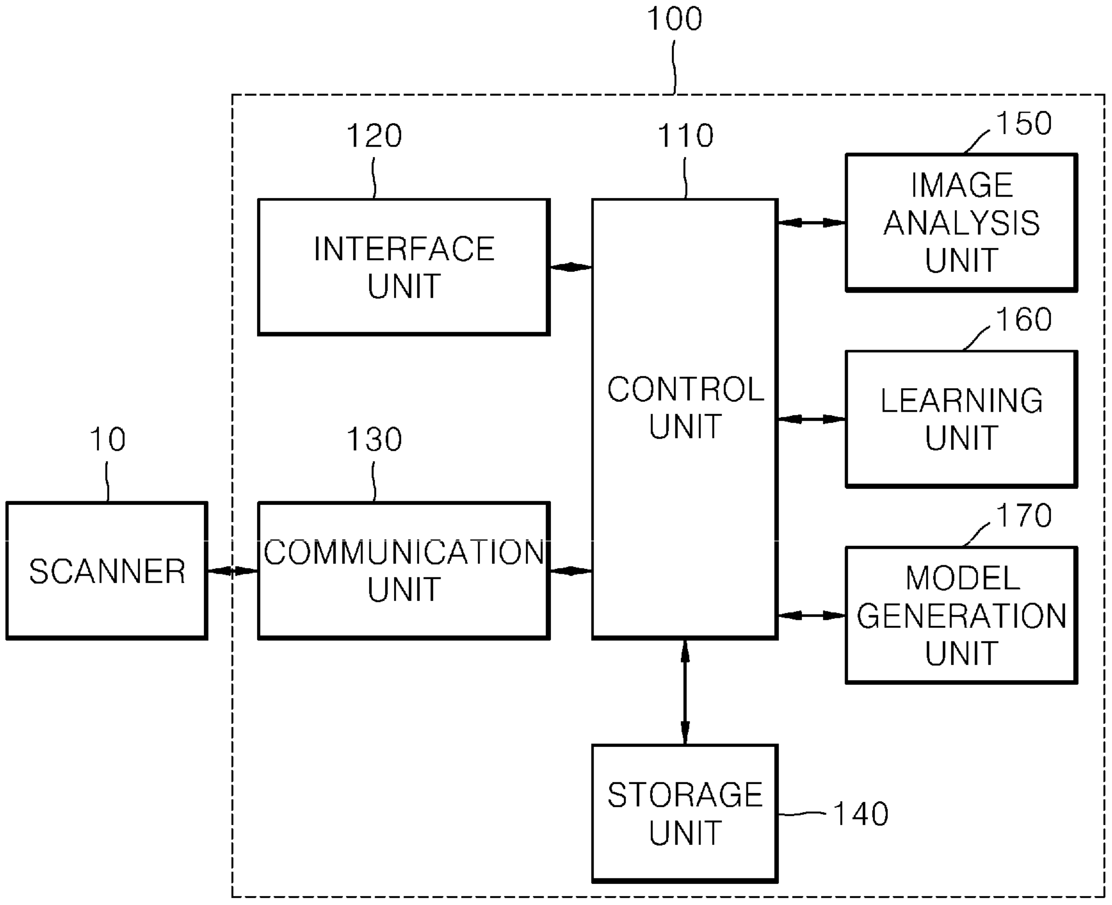
FIG. 1 is a view showing a configuration of an apparatus for generating a virtual model according to one embodiment of the present disclosure.

Hereinafter, some embodiments of the present disclosure will be described in detail with reference to exemplary drawings. In adding reference numerals to the components of each drawing, it should be noted that the same components are given the same reference numerals as much as possible even though they are indicated on different drawings. In addition, in describing the embodiments of the present disclosure, when it is determined that a detailed description of a related known configuration or function interferes with the understanding of the embodiments of the present disclosure, the detailed description thereof will be omitted.

In describing the components of the embodiments of the present disclosure, terms such as first, second, A, B, (a), and (b) may be used. These terms are only to distinguish the component from other components, and the essence, sequence, or order of the component is not limited by the terms. In addition, unless otherwise defined, all terms used herein, including technical or scientific terms, have the same meaning as commonly understood by those skilled in the art to which the present disclosure pertains. Terms such as those defined in a commonly used dictionary should be interpreted as having a meaning consistent with the meaning in the context of the related art, and should not be interpreted in an ideal or excessively formal meaning unless explicitly defined in this application.

FIG. 1 is a view showing a configuration of an apparatus for generating a virtual model according to one embodiment of the present disclosure.

Referring to FIG. 1, an apparatus for generating a virtual model 100 includes a control unit 110, an interface unit 120, a communication unit 130, a storage unit 140, an image analysis unit 150, a learning unit 160, and a model generation unit 170. Here, the control unit 110, the image analysis unit 150, the learning unit 160, and the model generation unit 170 of the apparatus for generating the virtual model 100 according to this embodiment may be implemented as at least one processor.

The control unit 110 may control the operation of each component of the apparatus for generating the virtual model 100, and also process signals transmitted between the respective components.

The interface unit 120 may include an input means configured to receive commands from a user and an output means configured to output an operation state and result of the apparatus for generating the virtual model 100.

Here, through the input means, control commands for scan, data recognition, and model generation are input, and condition data for generating a tooth model are set or input.

For example, the input means may include a key button, and include a mouse, a joystick, a jog shuttle, a stylus pen, and the like. In addition, the input means may also include a soft key implemented on a display.

The output means may include a display, and also include a voice output means such as a speaker. At this time, when a touch sensor such as a touch film, a touch sheet, or a touch pad is provided on the display, the display functions as a touch screen, and the input means and the output means may be implemented in an integrated form.

Measurement data received from a scanner 10 may be displayed on the display, and a three-dimensional virtual model generated based on scan data and/or a finally generated tooth model may be displayed on the display. Here, the measurement data may include an intraoral scan image scanned with the scanner.

For example, the display may include a liquid crystal display (LCD), an organic light-emitting diode (OLED), a flexible display, a three-dimensional display (3D display), and the like.

The communication unit 130 may include a communication module configured to support a communication interface with the scanner 10. For example, the communication module may receive the measurement data from the scanner 10 by being communicatively connected to the scanner 10 configured to acquire the intraoral measurement data.

At this time, the communication module may communicate with the scanner 10 in a wired or wireless manner. A wired communication technique may include universal serial bus (USB) communication and the like, and a wireless communication technique may include a wireless Internet communication technique such as wireless LAN (WLAN), wireless broadband (Wibro), and Wi-Fi and/or a short-range wireless communication technique such as Bluetooth, ZigBee, and radio frequency identification (RFID).

Here, the scanner 10 acquires two-dimensional or three-dimensional scan data by recognizing a tooth, and transmits the obtained measurement data to the communication unit 130. For example, the scanner 10 may be an intraoral scanner or a model scanner.

In an embodiment of FIG. 1, the apparatus for generating the virtual model 100 is shown as being connected to the scanner 10 through the communication unit 130, but may also be implemented in the form of including the scanner 10 as one component of the apparatus for generating the virtual model 100.

Meanwhile, the storage unit 140 may store the measurement data received from the scanner 10. In addition, the storage unit 140 may store tooth and gum images recognized from the measurement data, the three-dimensional virtual model, the final model generated based on the three-dimensional virtual model, and the like.

In addition, the storage unit 140 may store learning data and/or an algorithm used to segment a tooth image from the measurement data. In addition, the storage unit 140 may also store condition data for selecting an area to be deleted from the three-dimensional virtual model and correcting the selected area to be deleted and/or an algorithm for executing the corresponding command.

Meanwhile, the storage unit 140 may store a command and/or an algorithm for generating a final model based on a designated area selected by a user from the three-dimensional virtual model.

Here, the storage unit 140 may include storage media such as random access memory (RAM), a static random access memory (SRAM), a read-only memory (ROM), a programmable read-only memory (PROM), and an electrically erasable programmable read-only memory (EEPROM).

When the measurement data is input (received) from the scanner 10, the image analysis unit 150 may image-process the input measurement data in a recognizable form.

The image analysis unit 150 analyzes the measurement data input (received) from the scanner 10 to recognize the shape of the target. For example, the image analysis unit 150 recognizes each of the shapes of tooth, gum, and the like from the measurement data.

At this time, the image analysis unit 150 may segment the image into a tooth image and a gum image using an image segmentation algorithm, and recognize the shape of the target from each of the segmented images.

The image analysis unit 150 provides shape information of the recognized target to the model generation unit 170.

In addition, the image analysis unit 150 segments the image of the measurement data for each target based on rule data learned by the learning unit 160. In other words, the image analysis unit 150 may segment the image of the measurement data into the tooth image and the gum image.

In addition, when the three-dimensional virtual model is generated by the model generation unit 170, the image analysis unit 150 may recognize a tooth area from the three-dimensional virtual model based on the segmented tooth image using the learned rule data.

For example, the image analysis unit 150 may segment the image of the measurement data into the tooth image and the gum image using a machine learning-based semantic segmentation.

At this time, the image analysis unit 150 may provide segmentation information of the tooth image to the control unit 110 and/or the model generation unit 170.

The learning unit 160 performs machine learning based on a two-dimensional or three-dimensional reference tooth image. At this time, the learning unit 160 segments the tooth and the gum from the reference tooth image to use the segmented tooth and gum as input data, and extracts a rule for distinguishing the tooth from the gum as a result of performing the machine learning.

At this time, the learning unit 160 may segment the tooth and the gum using the image of the measurement data as the input data to acquire data to be used for learning, and extract rule data for distinguishing the tooth from the gum using a backpropagation algorithm with the acquired data.

The learning unit 160 may store the extracted rule data in the storage unit 140, and provide the rule data to the control unit 110 and/or the image analysis unit 150.

Accordingly, the image analysis unit 150 may perform the machine learning according to the rule extracted by the learning unit 160, and segment the tooth area and the gum area from the three-dimensional virtual model based on the result of performing the machine learning.

The model generation unit 170 generates the three-dimensional virtual model based on the tooth image analysis result of the image analyzing unit 150. At this time, the control unit 110 may display the three-dimensional virtual model generated by the model generation unit 170 on a display screen.

At this time, the control unit 110 executes a model generation algorithm so that the user may check and/or modify the measurement data, the three-dimensional virtual model, and the like, and displays an execution screen of the model generation algorithm on the display.

The control unit 110 may display the measurement data, the three-dimensional virtual model, and the like on a display portion on the execution screen displayed on the display.

The control unit 110 may control execution of an operation tool provided on an operation portion of the execution screen, and control the corresponding operation to be performed by activating a tool operated or selected by the user.

For example, the control unit 110 controls an operation of each unit so that an operation responsive to the selection of a deleted area selection tool, a selection bar, a de-selection tool, an area lock tool, a model generation tool, and the like provided on the operation portion of the execution screen may be performed.

At this time, the model generation unit 170 may select the area to be deleted from the three-dimensional virtual model displayed on the display screen under the control of the control unit 110, correct the area to be deleted, remove the area to be deleted from the three-dimensional virtual model, and generate the final model.

Meanwhile, the control unit 110 may also control the operation of each unit so that the operation responsive to the icon selection of a designated area selection tool may be performed by activating the designated area selection tool provided on the operation portion of the execution screen.

The designated area selection tool is to select a designated area for generating the final model from the three-dimensional virtual model, and perform an operation of generating the final model based on the designated area.

Here, the designated area selection tool may include a first icon for designating the entire target area including the tooth and gum of the three-dimensional virtual model as a model generation area, a second icon for designating the tooth area and some gum areas around the tooth area as the model generation area, a third icon for designating the tooth area as the model generation area, and the like.

When any one of the icons of the designated area selection tool is selected by the user, the model generation unit 170 automatically selects the area set in response to the selected icon as the designated area from the three-dimensional virtual model. At this time, the model generation unit 170 may generate the final model based on the designated area automatically selected in response to the icon.

Here, the model generation unit 170 may delete data for an area other than the designated area among the measurement data before generating the final model. Meanwhile, the model generation unit 170 may remove an area where reliability is less than a reference value for areas other than the designated area, and also include the remaining areas in the final model.

Accordingly, the control unit 10 may display the tooth model generated based on the designated area on the display portion on the execution screen.

In this regard, the embodiments for each operation refer to the following description.

Figure 2:
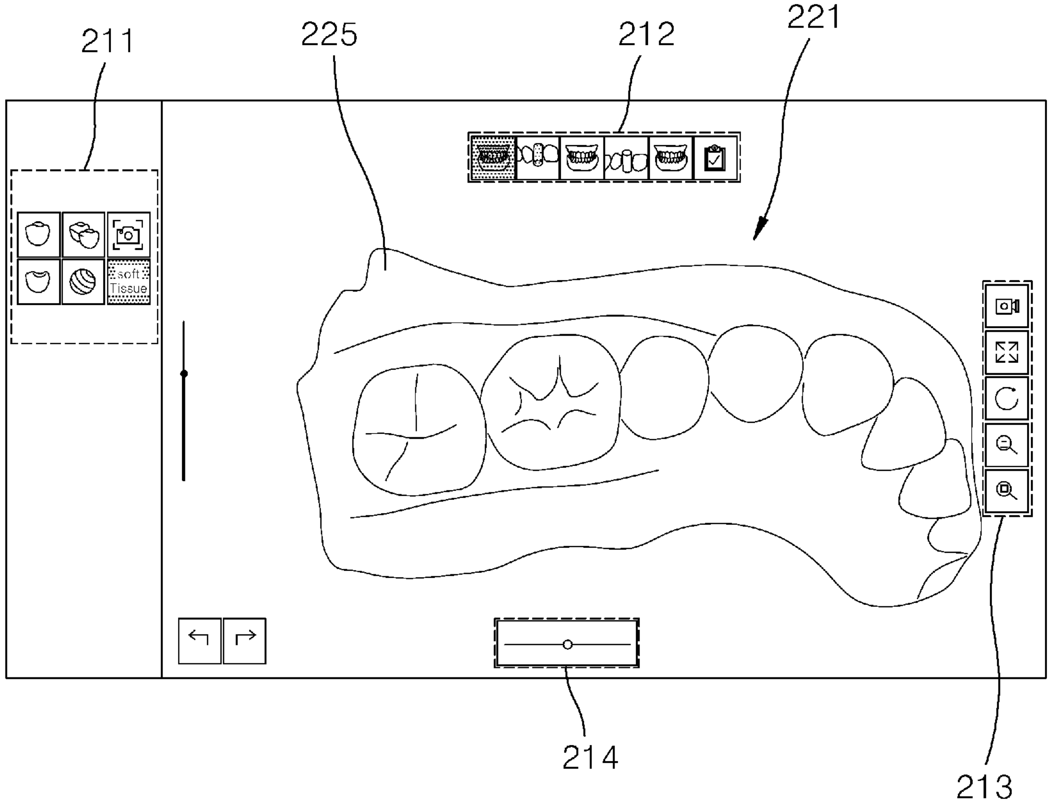
FIG. 2 is a view showing a three-dimensional virtual model according to one embodiment of the present disclosure.

FIG. 2 is a view showing a three-dimensional virtual model according to one embodiment of the present disclosure.

As shown in FIG. 2, the measurement data received from the scanner 10 is displayed on the display of the apparatus for generating the virtual model 100, and the apparatus for generating the virtual model 100 recognizes the shapes of the tooth and the gum from the measurement data, and generates the three-dimensional virtual model based on the recognized shapes.

At this time, the apparatus for generating the virtual model 100 may execute the model generation algorithm, and display the three-dimensional virtual model on the execution screen of the model generation algorithm.

Here, as shown in FIG. 2, the execution screen of the model generation algorithm may include a plurality of operation operations 211, 212, 213, and 214 and a display portion 221.

The plurality of operation portions 211, 212, 213, and 214 may include operation tools for executing the operation of changing a direction of the three-dimensional virtual model, selecting the area to be deleted, releasing and/or removing the selection, segmenting the tooth area and/or setting the lock.

The display portion 221 may display the measurement data input from the scanner 10, the three-dimensional virtual model, the area to be deleted, and/or the final model.

Figure 3:
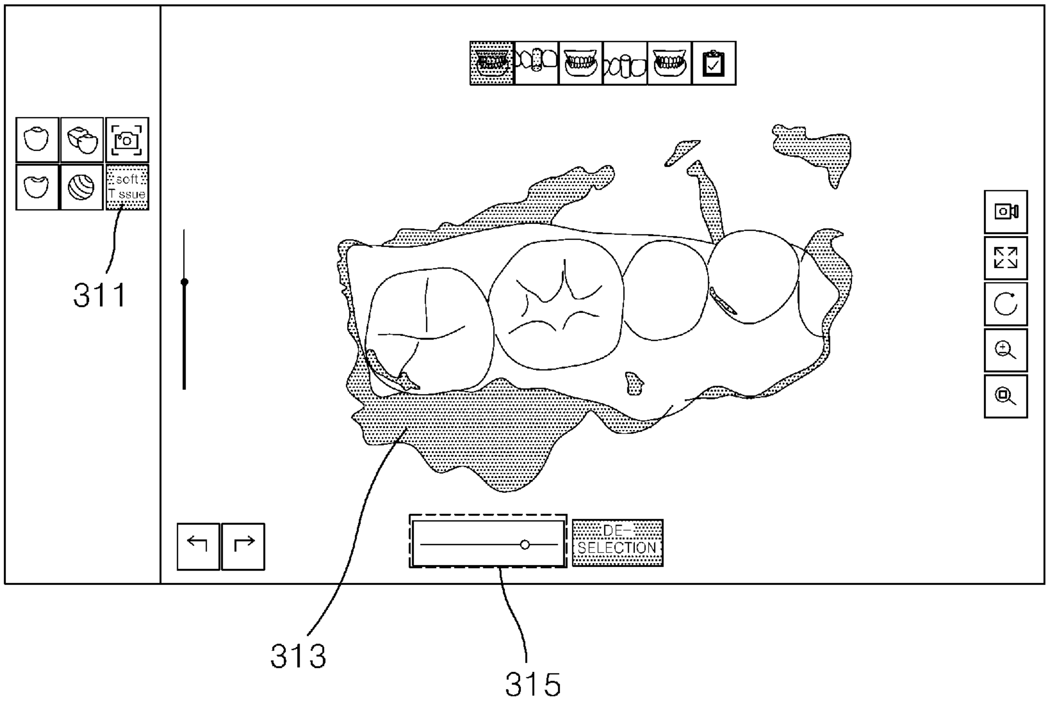
FIG. 3 is a view showing an area to be deleted of the three-dimensional virtual model according to one embodiment of the present disclosure.

FIG. 3 is a view showing an area to be deleted of the three-dimensional virtual model according to one embodiment of the present disclosure.

Referring to FIG. 3, when the deleted area selection tool of the operation portion 211 is selected in a state in which the three-dimensional virtual model is displayed on the display portion of the execution screen as shown in FIG. 2, the apparatus for generating the virtual model 100 may automatically select an area to be deleted 313 from the three-dimensional virtual model to display the area to be deleted 313 on the three-dimensional virtual model displayed on the execution screen.

For example, when a "Soft Tissue" button 311 provided on the operation portion 211 of the execution screen is selected by the user, the apparatus for generating the virtual model 100 may automatically select the area to be deleted 313 from the three-dimensional virtual model, and display the area to be deleted 313 on the three-dimensional virtual model displayed on the execution screen.

Here, the apparatus for generating the virtual model 100 may select, as the area to be deleted 313, an area where a data density is less than a preset reference value from the three-dimensional virtual model. A detailed description of the data density will be made with reference to an embodiment of FIG. 11.

In addition, the area to be deleted 313 may be visually expressed differently. For example, a color of the data density may be expressed differently, such as green, yellow, red, and the like, depending on a reference range. At this time, the user may determine a density range selected by a selection bar 315 according to a color difference for the data density.

For example, when the density range is expressed by being divided into green, yellow, and red, the green may be classified as an area having high reliability because the data density is greater than or equal to an upper reference value. In addition, the yellow may be classified as an area with medium reliability because the data density has a value between the upper reference value and a lower reference value. In addition, the red may be classified as an area having low reliability because the data density is less than the lower reference value. Meanwhile, the user may move the position of the selection bar 315 provided on the operation portion. Specifically, a reference value for selecting the area to be deleted 313 may be adjusted according to the movement of the selection bar 315 provided on the operation portion 211, and the area to be deleted 313 may be increased or decreased as the reference value decreases or increases according to the movement of the selection bar 315. Meanwhile, the density range may not necessarily be expressed by being divided by color, and for example, the density range may be expressed to have different patterns according to the reference range.

In this embodiment, the selection bar is configured in the form of a slide, but may also be configured in various forms, such as being configured in the form of a plurality of color buttons with respect to the color.

Figure 4A:
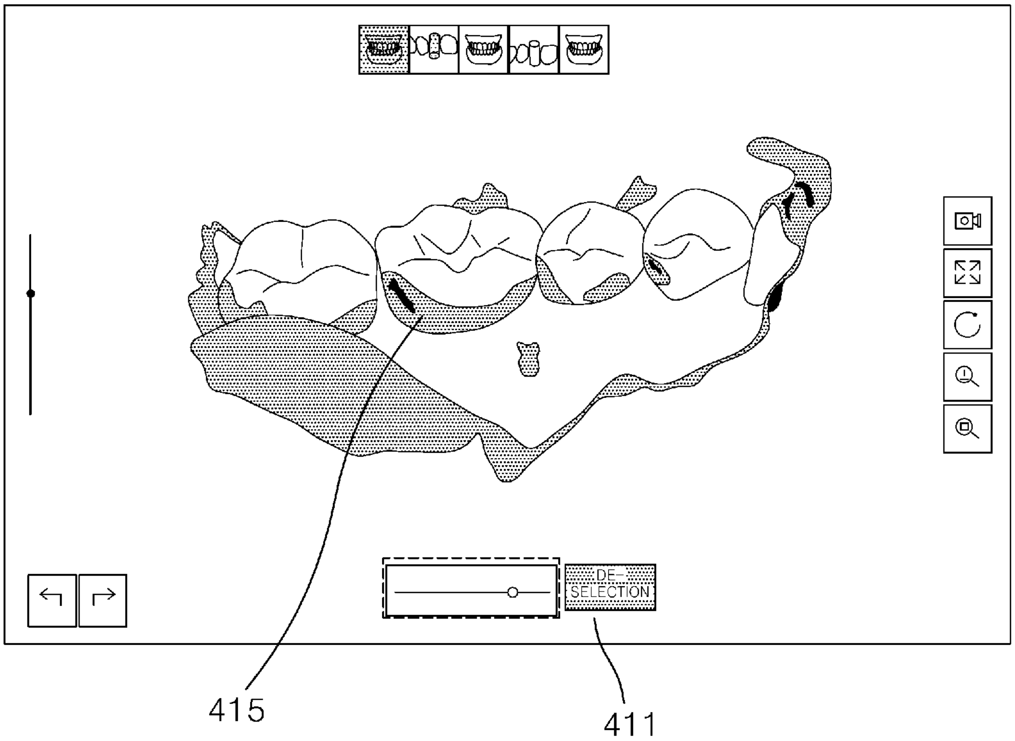
FIGS. 4A and 4B are views showing a correction operation of an area to be deleted according to a first embodiment of the present disclosure.
Figure 4B:
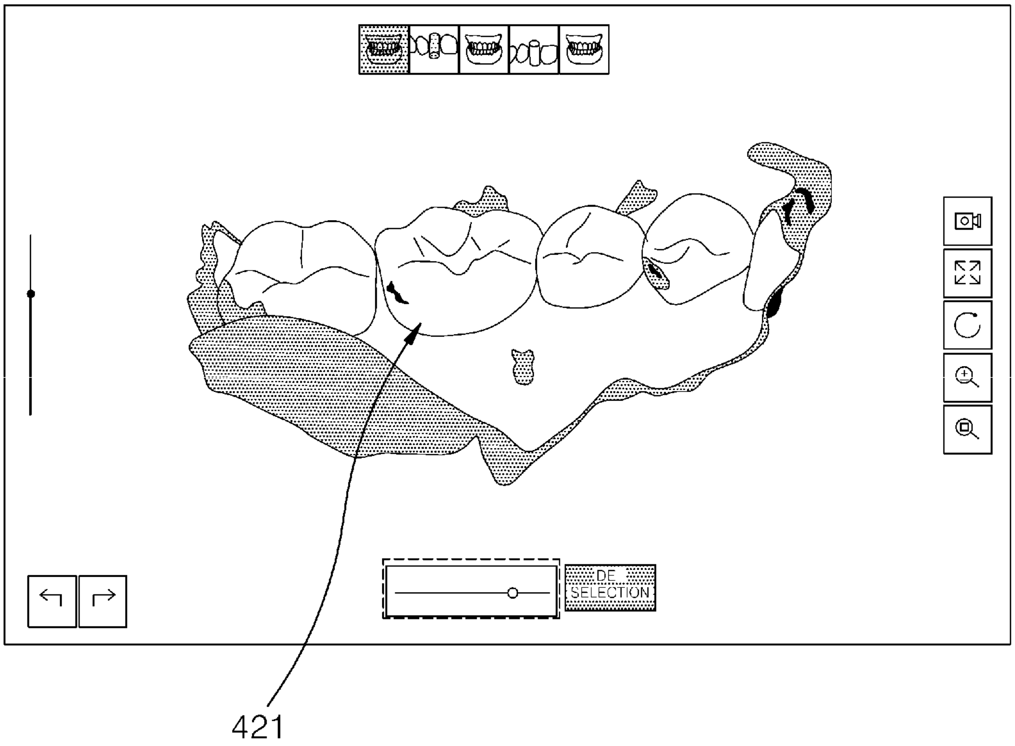

FIGS. 4A and 4B are views showing a correction operation of an area to be deleted according to a first embodiment of the present disclosure.

Since the density of the three-dimensional virtual model based on the measurement data is not constant, a portion in which the data density of the tooth of the three-dimensional virtual model or its surroundings is lower than the reference value may occur. Accordingly, as shown in FIG. 4A, there is a concern that a tooth or a necessary area around the tooth may be selected as the area to be deleted.

The tooth or the image around the tooth is a necessary area necessarily necessary to generate a highly reliable virtual model, and thus is not the target to be deleted. Accordingly, the user may select the de-selection tool 411 provided on the operation portion of the execution screen, and select the necessary area of the area to be deleted as an area to be de-selected 415.

At this time, when the area to be de-selected 415 of the area to be deleted is selected by the user, the area to be deleted in the tooth area of the three-dimensional virtual model is released as shown in reference numeral 421 of FIG. 4B.

As described above, it is possible to prevent the necessary area of the three-dimensional virtual model from being designated as the target to be deleted and deleted by the user's operation of the tool.

Figure 5:
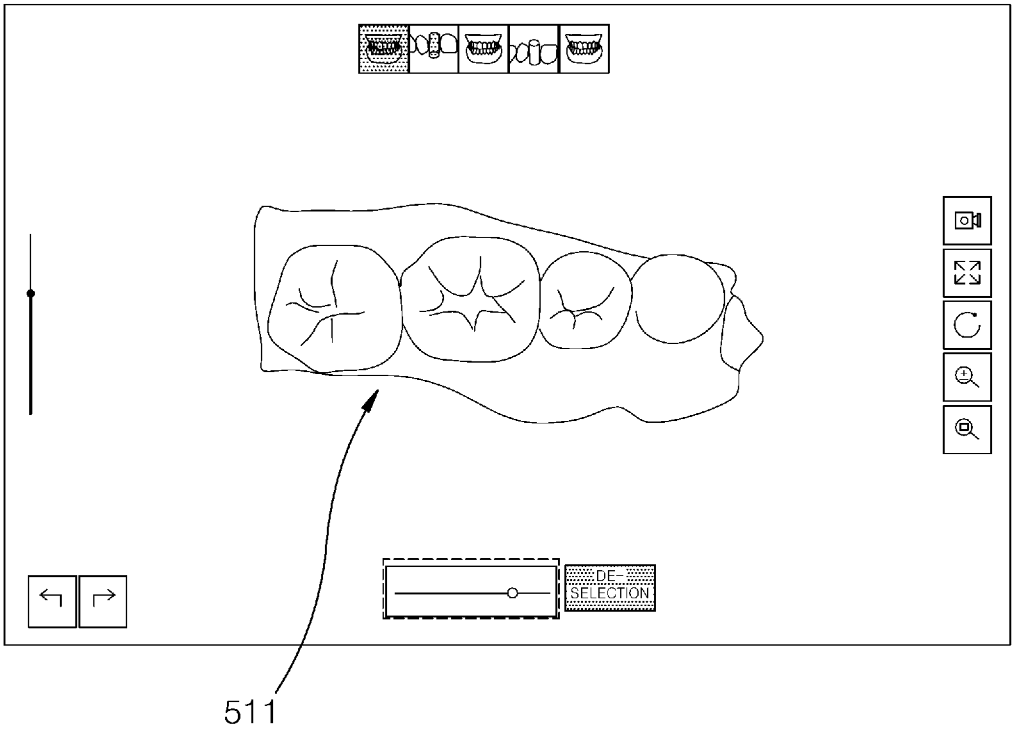
FIG. 5 is a view showing a final model according to one embodiment of the present disclosure.

FIG. 5 is a view showing a final model according to one embodiment of the present disclosure.

When the area to be deleted on the three-dimensional virtual model is determined through the operations of FIGS. 4A and 4B, the apparatus for generating the virtual model 100 removes the determined area to be deleted from the three-dimensional virtual model, and generates a final model.

At this time, as shown in FIG. 5, the apparatus for generating the virtual model 100 displays a final model 511 on the display portion of the execution screen.

The final model 511 displayed on the display portion has a neat shape because the area to be deleted, that is, the area where the data density is less than the reference value has been removed. In addition, as the final model is generated in a state in which the tooth area of the three-dimensional virtual model is maintained as it is, it is possible to provide a tooth model with high accuracy.

Figure 6A:
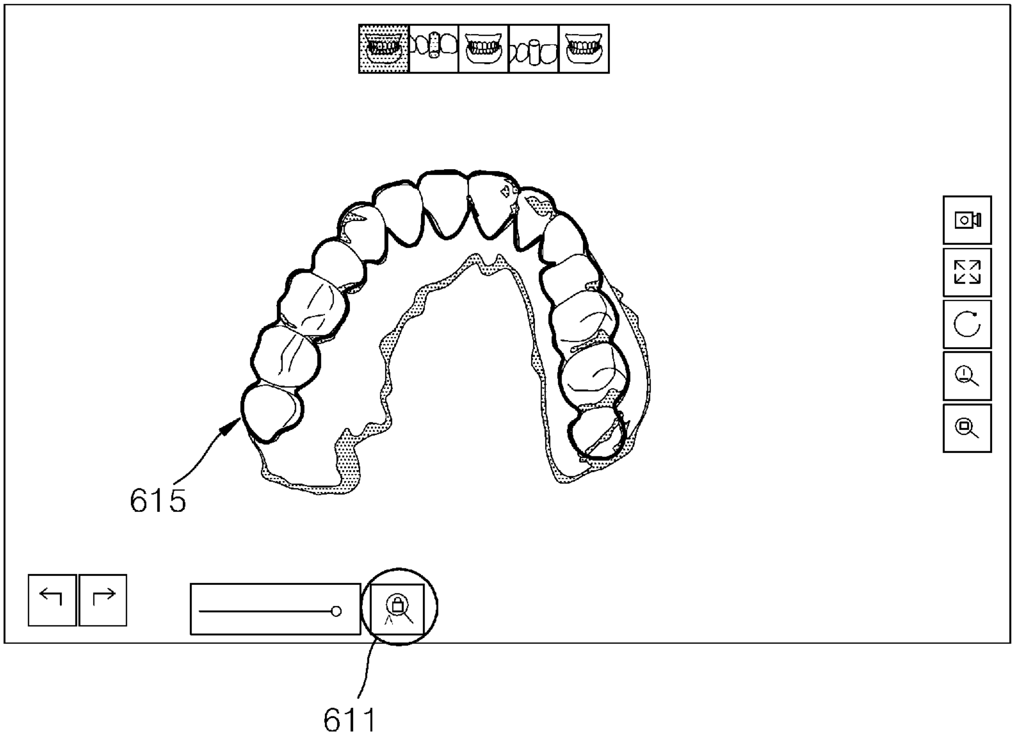
FIGS. 6A and 6B are views showing a correction operation of an area to be deleted according to a second embodiment of the present disclosure.
Figure 6B:
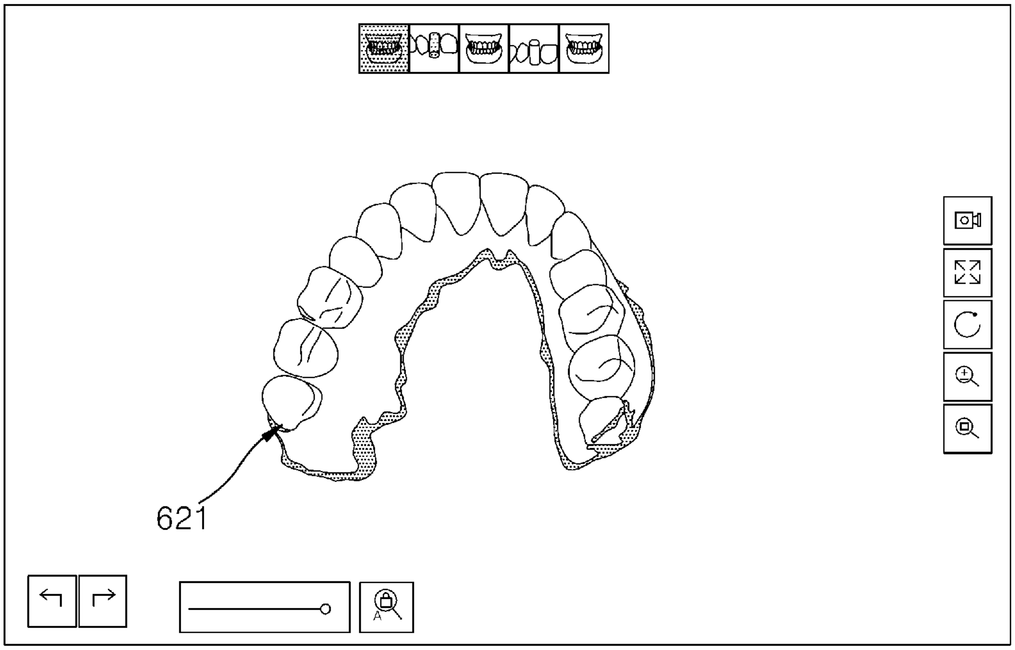

FIGS. 6A and 6B are views showing a correction operation of an area to be deleted according to a second embodiment of the present disclosure.

Since the density of the three-dimensional virtual model based on the measurement data is not constant, a portion in which the data density of the tooth of the three-dimensional virtual model or its surroundings is lower than the reference value may occur. Accordingly, as shown in FIG. 6A, there is a concern that a tooth or a necessary area around the tooth may be selected as the area to be deleted.

An image the tooth or around the tooth are not the target to be deleted because the image is necessarily required to generate a virtual model with high reliability. Accordingly, when an area lock tool 611 provided on the operation portion of the execution screen is selected by the user, the apparatus for generating the virtual model 100 performs the machine learning, automatically segments the tooth image from the measurement data according to the rule extracted as the learning result of the machine learning, and extracts the tooth area 615 from the three-dimensional virtual model based on the segmented tooth image.

At this time, the apparatus for generating the virtual model 100 sets a lock for the tooth area 615 extracted from the three-dimensional virtual model.

Accordingly, as shown in FIG. 6B, the apparatus for generating the virtual model 100 may automatically release the tooth area 615 extracted based on the machine learning of the area to be deleted from the area to be deleted, and generate the final area 621 by removing the area to be deleted from the area other than the extracted tooth area 615.

In the embodiment of FIGS. 6A and 6B, a technique of automatically selecting the tooth area according to the rule data derived by the machine learning to set the lock has been described, but the lock may also be set in other forms.

For example, the user may manually select an area where the lock is to set on the image of the measurement data, and also set the lock for the area selected by the user. In this case, it is possible to set the lock for the tooth area even when the machine learning is not performed.

Figure 7:
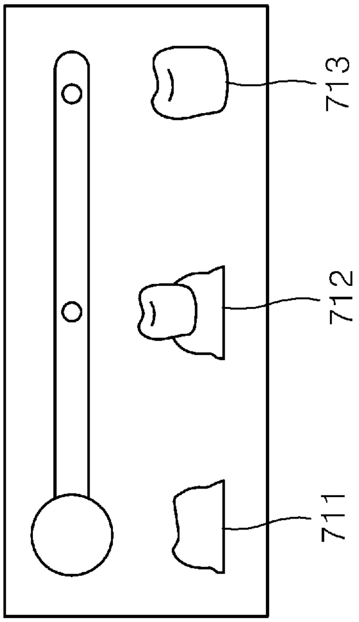
FIG. 7 is a view showing a designated area selection tool according to one embodiment of the present disclosure.
Figure 8A:
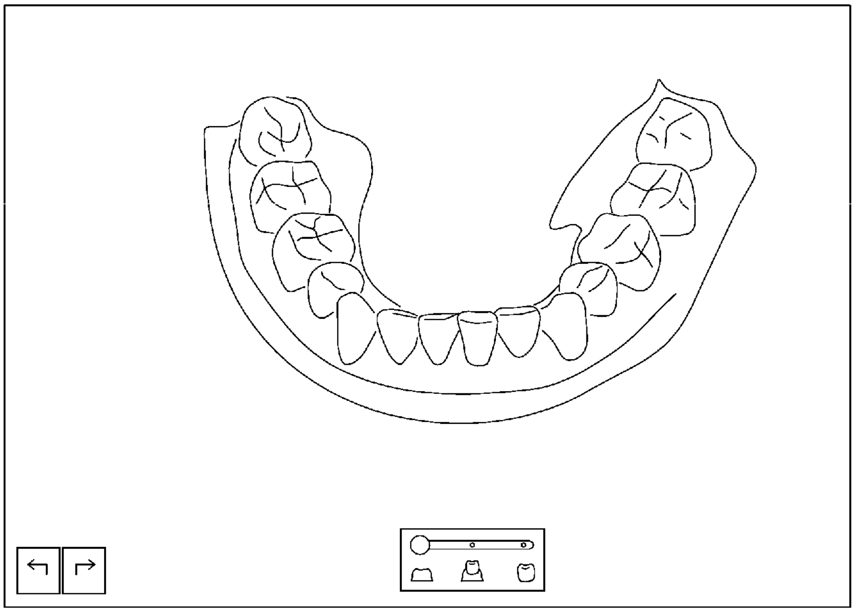
FIGS. 8A to 8C are views showing a final model generated based on a designated area according to one embodiment of the present disclosure.
Figure 8B:
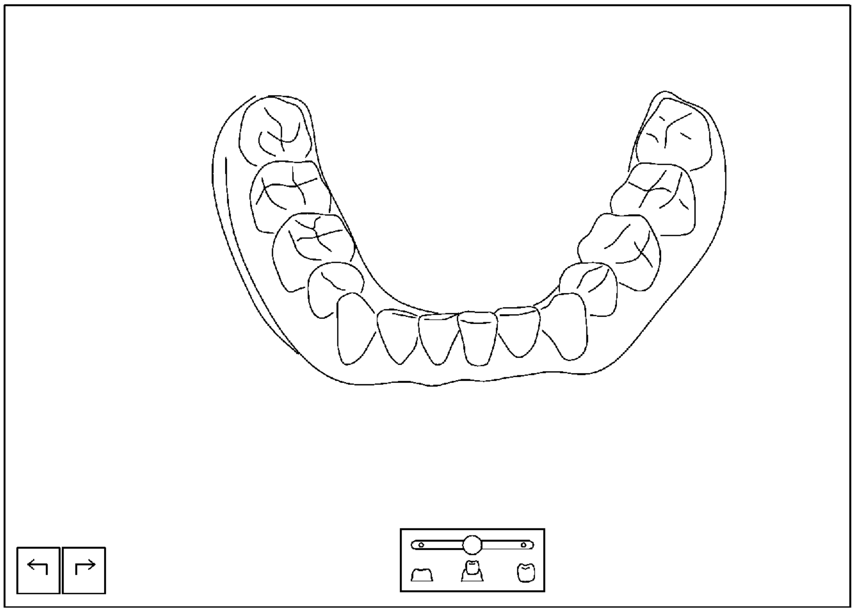
Figure 8C:
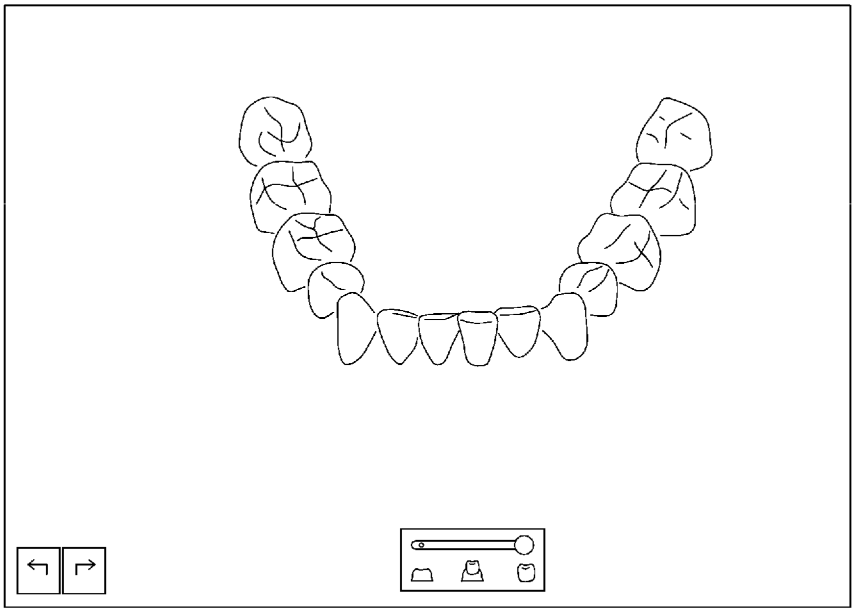

FIGS. 7 to 8C are views showing an operation of generating a final model according to another embodiment of the present disclosure.

First, FIG. 7 is a view showing a designated area selection tool according to one embodiment of the present disclosure.

Referring to FIG. 7, the designated area selection tool provides a function for designating an area where a final model is to be generated from the three-dimensional virtual model. Here, the designated area selection tool may be displayed on one area of the execution screen, and may include a first icon 711, a second icon 712, and a third icon 713.

First, the first icon 711 means an icon for selecting the entire target area including the tooth and the gum in the oral cavity from the three-dimensional virtual model as the designated area. Here, the designated area selected by the operation of the first icon 711 may include the entire target area where a filtering function is not performed.

In addition, the second icon 712 means an icon for selecting the tooth area and some gum areas around the tooth area from the three-dimensional virtual model as the designated area. Here, the designated area selected by the operation of the second icon 712 may not include the remaining gum area other than some gum areas around the tooth area due to the filtering function being performed.

In addition, the third icon means an icon for selecting the tooth area other than the gum as the designated area from the three-dimensional virtual model. Here, the designated area selected by the operation of the third icon 713 may not include all of the remaining areas other than the tooth area.

Accordingly, the user may select an icon corresponding to a desired area among the icons of the designated area selection tool.

When any one of the icons of the designated area selection tool is selected, the apparatus for generating the virtual model 100 may recognize the area set in response to the selected icon as the designated area from the three-dimensional virtual model to automatically select the designated area from the three-dimensional virtual model, and generate the final model based on the selected designated area to display the final model on the execution screen.

Here, the apparatus for generating the virtual model 100 may select the designated area from the three-dimensional virtual model by the machine learning. At this time, when the second icon or the third icon is selected, the apparatus for generating the virtual model 100 may automatically delete the measurement data for the area other than the designated area among the measurement data, and generate the final model based on the designated area using the measurement data of the selected designated area.

For example, when the first icon of the designated area selection tool is selected, the apparatus for generating the virtual model 100 selects the entire target area of the three-dimensional virtual model as the designated area.

At this time, the apparatus for generating the virtual model 100 may generate a tooth model, that is, a first model, using the measurement data of the entire target area including the tooth and gum selected as the designated area, and display the generated first model on the execution screen. Here, when the first icon is selected, the apparatus for generating the virtual model 100 generates the first model based on the measurement data of the entire target area without performing a separate operation of removing soft tissues.

An embodiment of the first model displayed on the execution screen according to the selection of the first icon may be shown in FIG. 8A.

The first model shown in FIG. 8A is generated based on the measurement data of the entire target area, and includes many soft tissues because the separate operation of removing the soft tissues is not performed. Accordingly, the first model may be usefully used when scanning an edentulous jaw without teeth.

As another example, when the second icon of the designated area selection tool is selected, the apparatus for generating the virtual model 100 selects the tooth area recognized by the machine learning and some gum areas around the tooth area as the designated area from the three-dimensional virtual model.

Here, the apparatus for generating the virtual model 100 may remove an area where data reliability is less than a reference value from the gum area of the three-dimensional virtual model, and select the remaining tooth areas and some gum areas as the designated area.

Accordingly, the apparatus for generating the virtual model 100 may generate a tooth model based on the tooth and gum areas, that is, a second model, using the measurement data of the tooth area and some gum areas around the tooth area selected as the designated area, and display the generated second model on the execution screen.

An embodiment of the second model displayed on the execution screen according to the selection of the second icon may be shown in FIG. 8B.

The model shown in FIG. 8B is generated based on the measurement data of the tooth area and some gum areas around the tooth area, and soft tissues that interfere with the scan has been removed from the gum area. Accordingly, the second model based on the gum and tooth areas may be usefully used when scanning a general tooth.

As another example, when the third icon of the designated area selection tool is selected, the apparatus for generating the virtual model 100 selects the tooth area recognized by the machine learning as the designated area from the three-dimensional virtual model. Here, the apparatus for generating the virtual model 100 may delete the measurement data received for the area other than the selected designated area in real time, and in this process, all soft tissues of the gum area may be removed.

Accordingly, the apparatus for generating the virtual model 100 may generate a tooth model based on the tooth area, that is, a third model, using the measurement data of the tooth area selected as the designated area, and display the generated third model on the execution screen.

At this time, when the second model has already been generated, the apparatus for generating the virtual model 100 may also generate the third model based on the remaining tooth areas other than the gum area from the second model.

An embodiment of the third model displayed on the execution screen according to the selection of the third icon may be shown in FIG. 8C.

The model shown in FIG. 8C is generated based on the measurement data of the tooth area, and all soft tissues have been removed. Accordingly, the third model based on the tooth area may be usefully used when only the tooth is scanned.

Figure 9:
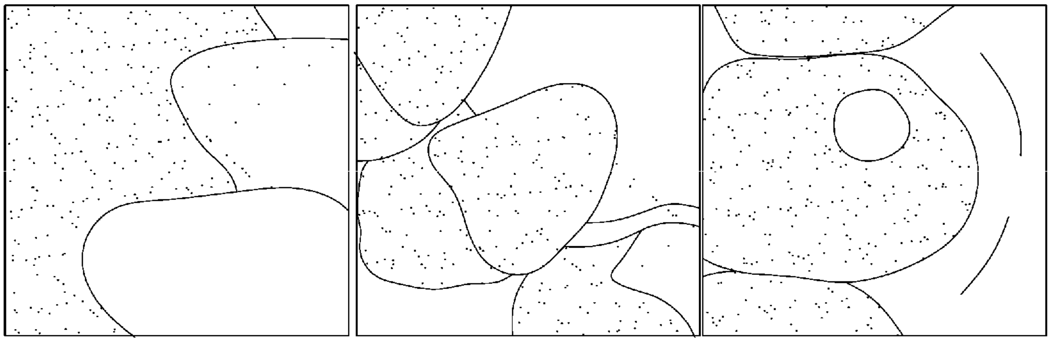
FIG. 9 is a view showing an image of measurement data according to one embodiment of the present disclosure.
Figure 10:
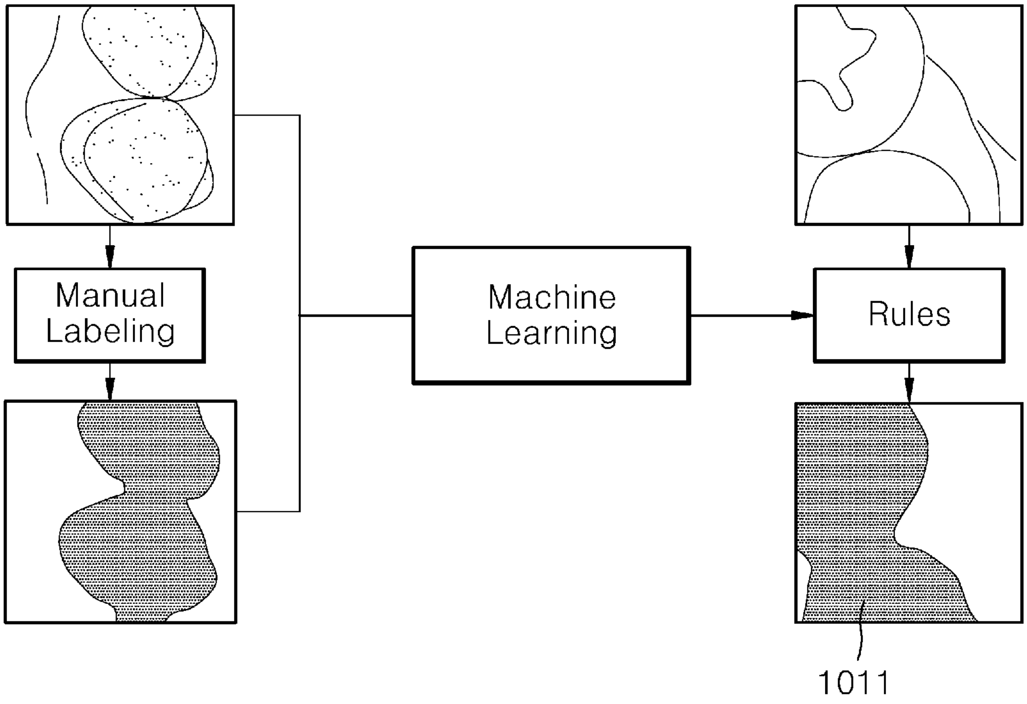
FIG. 10 is a view showing a tooth area detection operation based on machine learning according to an embodiment of the present disclosure.

FIG. 9 is a view showing the measurement data according to one embodiment of the present disclosure, and FIG. 10 is a view showing a tooth area detection operation based on machine learning according to an embodiment of the present disclosure.

The apparatus for generating the virtual model 100 segments the tooth image and the gum image from the measurement data (image) of FIG. 9, and extracts the rule for distinguishing the tooth image from the gum image by performing the machine learning using the segmented tooth image and gum image as input data.

In a general image segmentation, pixels having the same properties are grouped and segmented. In this case, when the object to be segmented does not have consistent properties, accurate segmentation is impossible.

For example, when the colors of the tooth and the gum in the image obtained from the scanner 10 are similar, or when foreign matters or prostheses are attached to the tooth, it is difficult to distinguish the tooth from the gum using the general image segmentation.

Accordingly, there occurs a case in which only area separation (segmentation) is possible, and the meaning of the separated area may not be accurately recognized with the image segmentation.

Accordingly, as shown in FIG. 10, the apparatus for generating the virtual model 100 according to the present disclosure may acquire data to be used for learning by segmenting the tooth and gum using the image of the measurement data as the input data, and extract the rule of distinguishing the tooth from the gum using the backpropagation algorithm with the acquired data.

According to the machine learning-based semantic segmentation, when the input data is a tooth scan image, what each pixel represents is predicted for each pixel of the tooth scan image in a unit of pixel.

Accordingly, the apparatus for generating the virtual model 100 segments a tooth image 1011 from the measurement data based on the rule extracted as the learning result of the machine learning, and extracts the tooth area from the three-dimensional virtual model based on the segmented tooth image 1011.

As described above, when the tooth area is segmented based on the machine learning, it is possible to extract the tooth area with higher reliability. The extracted tooth area may be used to exclude the tooth area from the target to be deleted from the three-dimensional virtual model. Meanwhile, the extracted tooth area may be used to determine the designated area according to the icon selection of the designated area selection tool.

Figure 11:
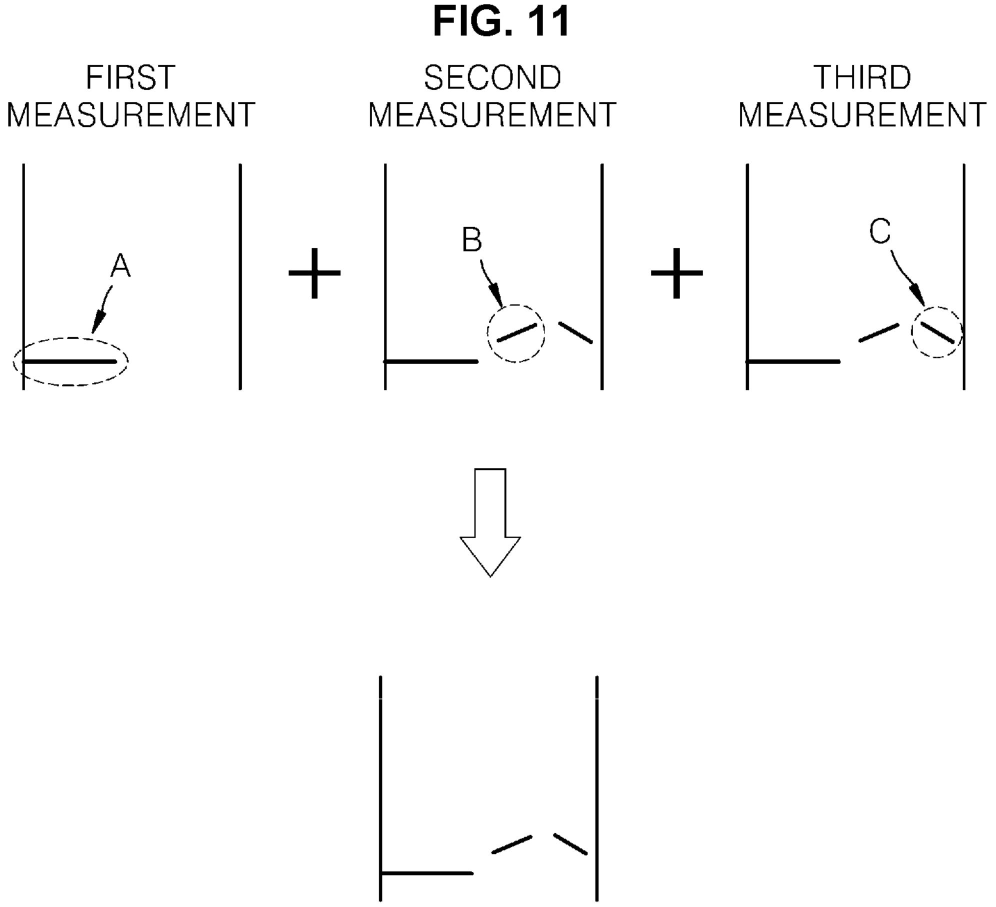
FIG. 11 is a view showing an example of the measurement data according to one embodiment of the present disclosure.

FIG. 11 is a view showing an example of the measurement data according to one embodiment of the present disclosure.

Referring to FIG. 11, the scanner may measure the intraoral area several times per cycle instead of only scanning the intraoral tooth image once. In this case, some measured data may vary depending on the intraoral state when the intraoral area is scanned.

For example, as shown in FIG. 11, data may be measured only for an area A with teeth at a first measurement, and other materials in an intraoral area B other than the area A with teeth may be measured together at a second measurement.

In addition, other materials present in an area C other than the areas A and B may be measured again at a third measurement.

In this case, the final measurement data is data obtained by accumulating the data measured at the first measurement, the second measurement, and the third measurement, and three data is accumulated for the area A, two data is accumulated for the area B, and one data is accumulated for the area C.

Accordingly, the area A where the three data are accumulated may be determined as an area having high reliability because the data density is higher than those of the areas B and C.

Meanwhile, the area B may be determined as the area with medium reliability because two data are accumulated and the data density is medium, and the area C may be determined as the area with low reliability because one data is accumulated and the data density is low.

The apparatus for generating the virtual model 100 according to these embodiments operating as described above may be implemented in the form of an independent hardware device, and driven in the form included in other hardware devices such as a microprocessor or a general-purpose computer system as at least one processor.

An operation flow of the apparatus according to the present disclosure configured as described above will be described in more detail as follows.

Figure 12:
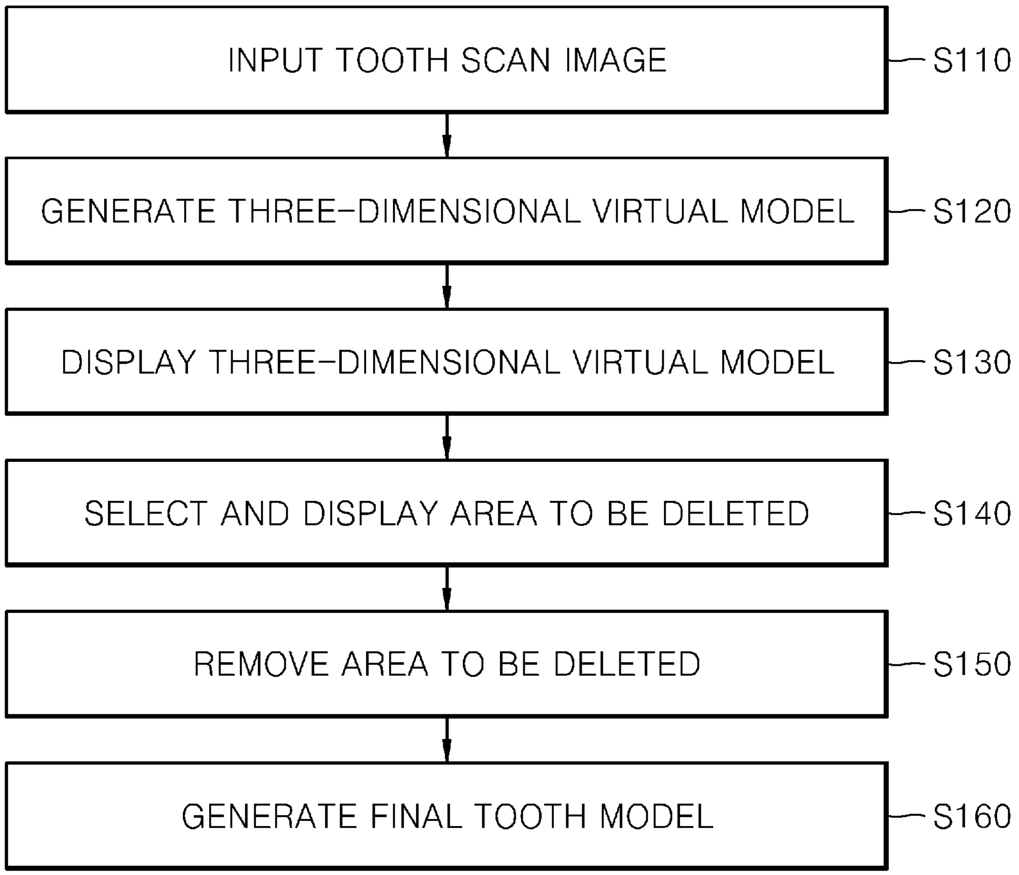
FIGS. 12 and 13 are views showing an operation flow of a method of generating a virtual model according to one embodiment of the present disclosure.
Figure 13:
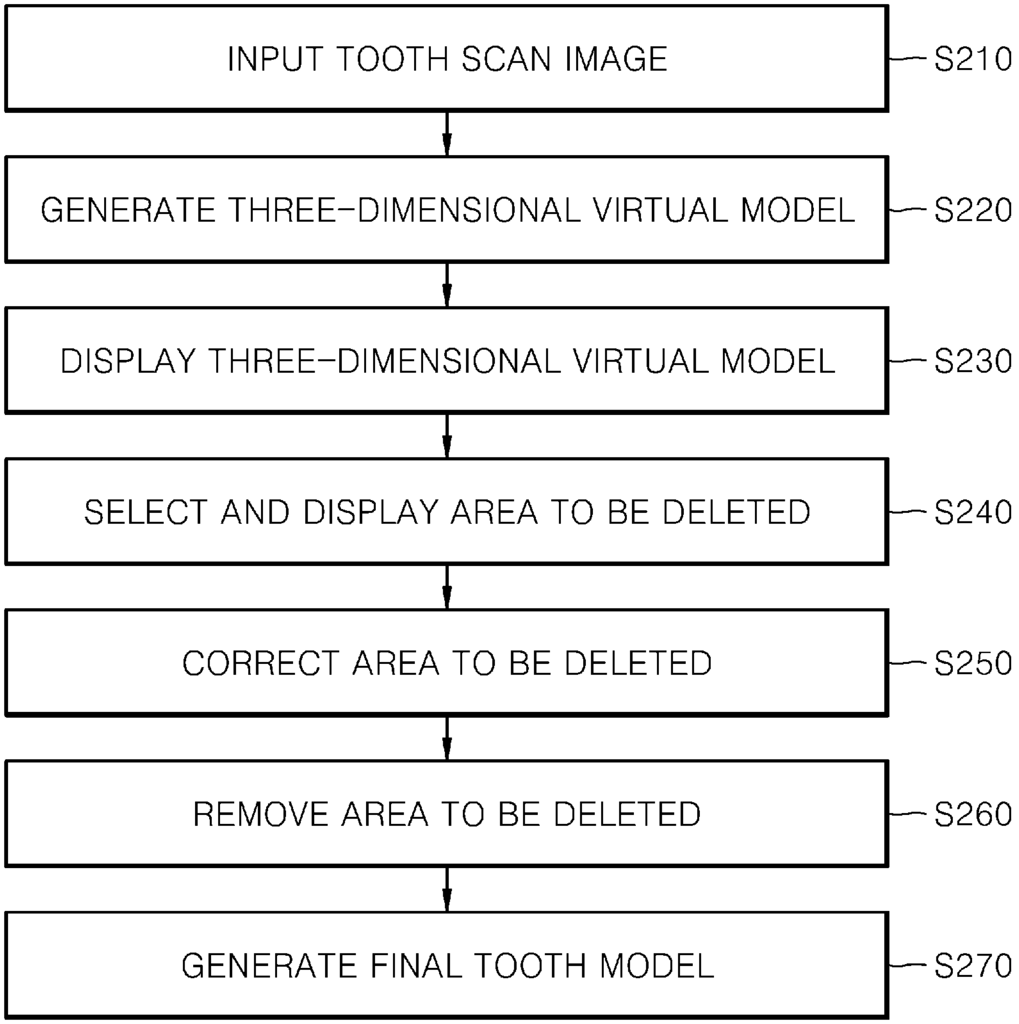

FIGS. 12 and 13 are views showing an operation flow of a method of generating a virtual model according to the present disclosure.

First, referring to FIG. 12, when the measurement data is input from the scanner 10 (S110), the apparatus for generating the virtual model 100 generates the three-dimensional virtual model based on the input measurement data (S120).

In the process 'S120', the apparatus for generating the virtual model 100 recognizes the shape of each target such as tooth and gum from the measurement data, and generates the three-dimensional virtual model according to the recognized shape. At this time, the apparatus for generating the virtual model 100 may also generate the three-dimensional virtual model corresponding to the measurement data using a three-dimensional modeling algorithm.

When the three-dimensional virtual model is completely generated in the process 'S120', the apparatus for generating the virtual model 100 displays the generated three-dimensional virtual model on the display screen so that the user may check the generated three-dimensional virtual model (S130). An embodiment of the three-dimensional virtual model will be described with reference to FIG. 2.

When displaying the three-dimensional virtual model on the display screen, the apparatus for generating the virtual model 100 selects and displays the area to be deleted from the three-dimensional virtual model (S140). Here, the area to be deleted means the area where the data density is less than the reference value from the three-dimensional virtual model. An embodiment of the area to be deleted is shown in FIG. 3.

In the process 'S140', the apparatus for generating the virtual model 100 may automatically select the area to be deleted when events occur, such as a case in which a specific button is manipulated or a specific menu or a specific mode is selected after the three-dimensional virtual model is displayed.

The area to be deleted may be displayed in a color and/or pattern that is distinguished from the three-dimensional virtual model so that the user may easily recognize the area to be deleted.

Thereafter, the apparatus for generating the virtual model 100 removes the area to be deleted from the three-dimensional virtual model (S150), and generates the final model based on the three-dimensional virtual model from which the area to be deleted has been removed (S160). An embodiment of the final model is shown in FIG. 5.

Meanwhile, as shown in FIG. 13, the apparatus for generating the virtual model 100 may additionally perform an operation of correcting the area to be deleted.

Referring to FIG. 13, when the measurement data (image) is input from the scanner 10 (S210), the apparatus for generating the virtual model 100 generates the three-dimensional virtual model based on the input measurement data (image) (S220).

In the process 'S220', the apparatus for generating the virtual model 100 recognizes the shape of each target such as tooth and gum from the measurement data (image), and generates the three-dimensional virtual model according to the recognized shape. At this time, the apparatus for generating the virtual model 100 may also generate the three-dimensional virtual model corresponding to the measurement data using a three-dimensional modeling algorithm.

When the three-dimensional virtual model is completely generated in the process 'S220', the apparatus for generating the virtual model 100 displays the generated three-dimensional virtual model on the display screen so that the user may check the generated three-dimensional virtual model (S230).

When displaying the three-dimensional virtual model on the display screen, the apparatus for generating the virtual model 100 selects the area to be deleted from the three-dimensional virtual model and displays the area to be deleted together on the display screen (S240).

At this time, the apparatus for generating the virtual model 100 may correct the area to be deleted selected in the process 'S240' (S250).

Specifically, the apparatus for generating the virtual model 100 may de-select and exclude the area designated by the user from the area to be deleted, or set a lock for the tooth area selected according to the rule learned based on the machine learning, and also de-select and exclude the area where the lock is set from the target to be deleted. A detailed embodiment thereof will be described with reference to FIGS. 14 and 15.

Thereafter, the apparatus for generating the virtual model 100 removes the corrected area to be deleted from the three-dimensional virtual model (S260), and generates the final model based on the three-dimensional virtual model from which the area to be deleted has been removed (S270).

Figure 14:
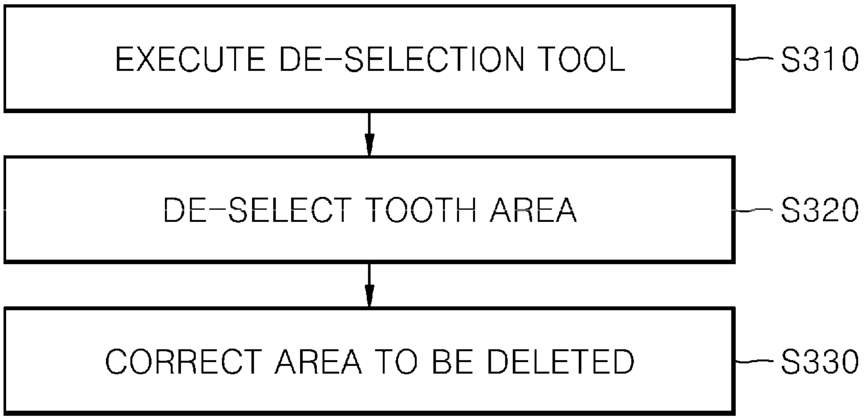
FIG. 14 is a view showing a first example of the method of generating the virtual model according to one embodiment of the present disclosure.

As a first embodiment of the operation of correcting the area to be deleted, as shown in FIG. 14, the apparatus for generating the virtual model 100 may exclude the tooth area from the area to be deleted by the user's tool operation.

Referring to FIG. 14, when the area to be deleted is displayed on the three-dimensional virtual model in the process 'S240' of FIG. 13, the apparatus for generating the virtual model 100 executes the de-selection tool at the user's request (S310).

At this time, when the de-selection tool is activated, the user may designate the tooth area or a de-selection area around the tooth area in the area to be deleted using the activated de-selection tool.

The apparatus for generating the virtual model 100 releases the area designated by the operation of the de-selection tool, that is, the tooth area (S320). The tooth area may be excluded from the area to be deleted by the 'S320' process.

Accordingly, the apparatus for generating the virtual model 100 corrects the area to be deleted to the area to be deleted from which the tooth area has been excluded (S330).

Figure 15:
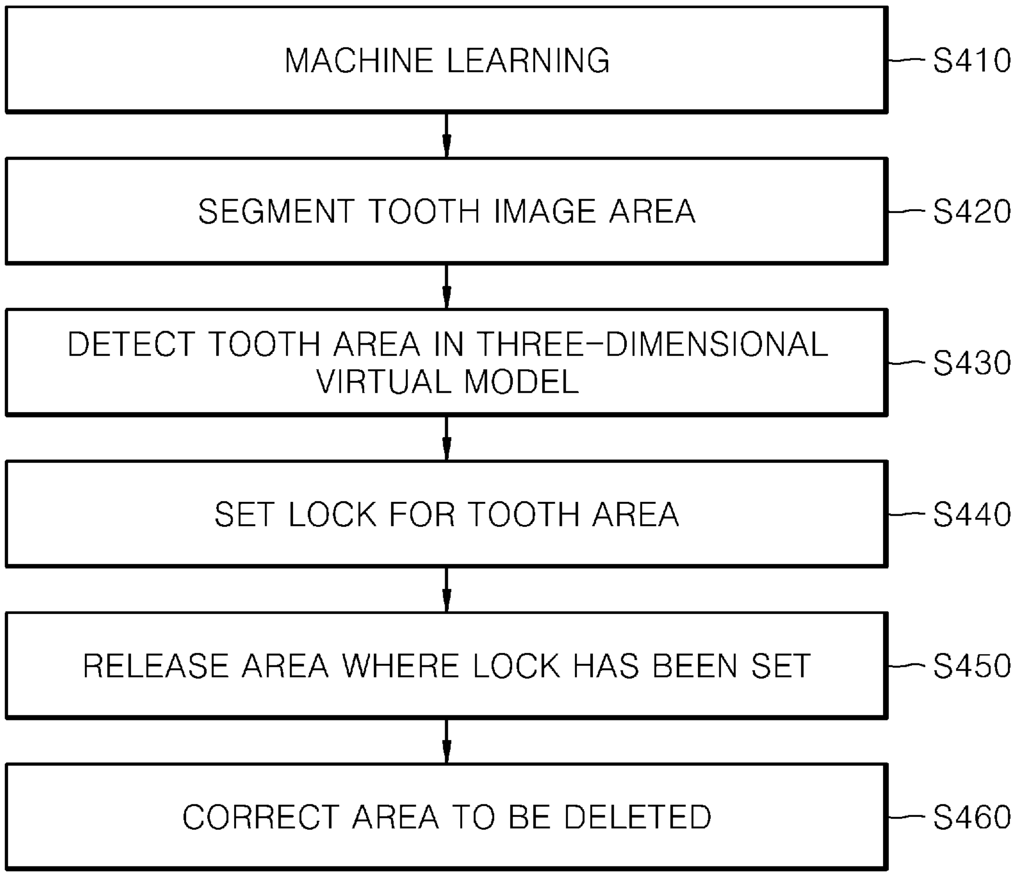
FIG. 15 is a view showing a second example of the method of generating the virtual model according to one embodiment of the present disclosure.

As a second embodiment of the operation of correcting the area to be deleted, as shown in FIG. 15, the apparatus for generating the virtual model 100 may de-select the tooth area from the area to be deleted by setting the lock for the tooth area.

Referring to FIG. 15, when the area to be deleted is displayed on the three-dimensional virtual model in the process 'S240' of FIG. 13, the apparatus for generating the virtual model 100 may set the lock for the tooth area of the three-dimensional virtual model at the user's request (S440).

The apparatus for generating the virtual model 100 performs the machine learning on the reference tooth image before setting the lock for the tooth area of the three-dimensional virtual model (S410), and segments the area corresponding to the tooth image from the measurement data according to the rule learned as the result of performing the machine learning (S420).

At this time, the apparatus for generating the virtual model 100 detects the tooth area of the three-dimensional virtual model corresponding to the tooth image segmented from the measurement data (S430), and sets the lock for the tooth area detected in the process 'S430' (S440).

Accordingly, the apparatus for generating the virtual model 100 releases the area where the lock has been set (S450). The tooth area may be excluded from the area to be deleted by the 'S450' process.

Accordingly, the apparatus for generating the virtual model 100 corrects the area excluding the tooth area as the area to be deleted (S460).

Although not shown in the above embodiments, in the embodiments, the user may also arbitrarily select some areas including teeth and set the lock for the selected area so that the corresponding area is not selected as the area to be deleted.

The above description is merely illustrative of the technical spirit of the present disclosure, and various modifications and changes will be possible by those skilled in the art to which the present disclosure pertains without departing from the essential characteristics of the present disclosure.

Accordingly, the embodiments disclosed in the present disclosure are not intended to limit the technical spirit of the present disclosure but to describe it, and the scope of the technical spirit of the present disclosure is not limited by these embodiments. The scope of the present disclosure should be construed by the following claims, and all technical spirits within the scope equivalent thereto should be construed as being included in the scope of the present disclosure.

INDUSTRIAL APPLICABILITY

The present disclosure provides an apparatus and method for generating the virtual model, which may generate the tooth model simply and quickly by automatically removing the noise area with low density from measurement data.

The invention claimed is:

1. An apparatus for generating a virtual model, the apparatus comprising:

an intraoral scanner configured to acquire a continuous two-dimensional image within a measurement space; and a model generation unit configured to generate a three-dimensional virtual model by converting a two-dimensional image acquired from the intraoral scanner, wherein the model generation unit removes one area according to reliability of data from the three-dimensional virtual model and generates a final model based on the remaining areas, wherein in the area where image data acquired from the intraoral scanner is accumulated a data density is increased, wherein the model generation unit is configured to calculate a noise area where the reliability of the data is less than a preset reference value as the data density is low in the three-dimensional virtual model, and generate the final model based on the remaining areas other than the noise area of three-dimensional virtual model by removing the noise area from the three-dimensional virtual model, wherein the model generation unit releases an area where the data density is low and the reliability of the data is less than the preset reference value in a necessary area which includes an extracted tooth area from an area to be deleted so that the model generation unit removes a corrected area to be deleted from the three-dimensional virtual model and generates the final model.

2. The apparatus of claim 1, further comprising: a control unit configured to display the generated three-dimensional virtual model on a display screen, and select the calculated area from the three-dimensional virtual model as the area to be deleted to display the calculated area on the display screen.

3. The apparatus of claim 2, wherein the area to be deleted is an area where a data density is less than a preset reference value in the three-dimensional virtual model.

4. The apparatus of claim 2, wherein the control unit provides a tool for correcting the area to be deleted through the display screen before generating the final model.

5. The apparatus of claim 4, wherein the model generation unit excludes a necessary area from the area to be deleted according to an operation of a de-selection tool.

6. The apparatus of claim 5, wherein the necessary area includes a tooth area and areas around the tooth area.

7. The apparatus of claim 4, further comprising: a learning unit configured to perform machine learning using a tooth image and a gum image of reference data as input data, and extract a rule for distinguishing tooth and gum as a learned result of the machine learning when an area lock tool is executed.

8. The apparatus of claim 7, further comprising: an image analysis unit configured to segment the tooth image based on the rule extracted as the result of performing the machine learning, and extract the tooth area of the three-dimensional virtual model based on the segmented tooth image.

9. The apparatus of claim 8, wherein the model generation unit sets a lock for the tooth area of the three-dimensional virtual model, and excludes the area where a lock is set from the area to be deleted.

10. The apparatus of claim 4, wherein the model generation unit sets a lock for an area selected by the operation of the tool, and excludes the area where the lock is set from the area to be deleted when the area lock tool is executed.

11. The apparatus of claim 1, wherein the reference value is adjustable.

12. The apparatus of claim 11, wherein the reference value is adjusted by an operation of a selection bar or a button provided on an operation portion of the display screen.

13. The apparatus of claim 1, wherein the model generation unit automatically selects a designated area from the three-dimensional virtual model by a designated area selection tool, and generates the final model based on the selected designated area.

14. The apparatus of claim 13, wherein the designated area selection tool includes a first icon corresponding to the entire target area of the three-dimensional virtual model, a second icon corresponding to a gum and tooth area, and a third icon corresponding to a tooth area.

15. The apparatus of claim 1, wherein the model generation unit is configured to release the necessary area which includes an extracted tooth area from the area to be deleted such that the necessary area is not included in any deletion target area and cannot be deleted, and removes only the corrected area to be deleted, which comprises portions of the initially calculated area to be deleted excluding the necessary area.

16. A method of generating a virtual model, the method comprising:

acquiring a continuous intraoral two-dimensional image within a measurement space by an intraoral scanner;

generating a three-dimensional virtual model by converting the two-dimensional image acquired from the intraoral scanner; and removing one area according to reliability of data from the three-dimensional virtual model, and generating a final model based on the remaining areas, wherein in the area where image data acquired from the intraoral scanner is accumulated a data density is increased, wherein the generating of the final model includes:

calculating a noise area where the reliability of the data is less than a preset reference value as the data density is low from the three-dimensional virtual model, and generating the final model based on the remaining areas other than the noise area of three-dimensional virtual model by removing the noise area from the three-dimensional virtual model, wherein the final model is generated by an area where the data density is low and the reliability of the data is less than the preset reference value in a necessary area which includes an extracted tooth area is released from an area to be deleted so that a corrected area to be deleted is removed from the three-dimensional virtual model.

17. The method of claim 16, further comprising: selecting the calculated area as an area to be deleted from the three-dimensional virtual model and displaying the calculated area on a display screen, wherein the area to be deleted is an area where a data density is less than a preset reference value in the three-dimensional virtual model.

18. The method of claim 17, further comprising: correcting the area to be deleted, wherein the correcting of the area to be deleted includes:

executing a de-selection tool; and excluding a necessary area from the area to be deleted according to an operation of the de-selection tool.

19. The method of claim 18, wherein the correcting of the area to be deleted includes:

segmenting the image based on machine learning;

extracting a tooth area of the three-dimensional virtual model based on a tooth image from the segmented image;

setting a lock for the tooth area of the three-dimensional virtual model; and excluding the tooth area where the lock is set from the area to be deleted.

20. The method of claim 18, wherein the correcting of the area to be deleted includes:

setting a lock for an area selected by an operation of an area lock tool; and excluding the area where the lock is set from the area to be deleted.

* * * * *